(12) United States Patent
Sheridan et al.

(10) Patent No.: US 11,823,359 B2
(45) Date of Patent: Nov. 21, 2023

(54) SYSTEMS AND METHODS FOR LEVELING IMAGES

(71) Applicant: Google LLC, Mountain View, CA (US)

(72) Inventors: Alan Sheridan, Apex, NC (US); David Santana, Graham, NC (US); Michael Vitus, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 91 days.

(21) Appl. No.: 16/624,481

(22) PCT Filed: Dec. 15, 2017

(86) PCT No.: PCT/US2017/066752
§ 371 (c)(1),
(2) Date: Dec. 19, 2019

(87) PCT Pub. No.: WO2019/070300
PCT Pub. Date: Apr. 11, 2019

(65) Prior Publication Data
US 2021/0027434 A1    Jan. 28, 2021

Related U.S. Application Data

(60) Provisional application No. 62/568,976, filed on Oct. 6, 2017.

(51) Int. Cl.
*G06T 5/00* (2006.01)
*G06N 20/00* (2019.01)
*G06N 3/084* (2023.01)

(52) U.S. Cl.
CPC ............ *G06T 5/006* (2013.01); *G06N 3/084* (2013.01); *G06N 20/00* (2019.01); *G06T 2207/20081* (2013.01); *G06T 2207/20084* (2013.01)

(58) Field of Classification Search
CPC .......... G06T 5/006; G06T 2207/20081; G06T 2207/20084; G06T 3/608; G06N 20/00; G06N 3/084
See application file for complete search history.

(56) References Cited

U.S. PATENT DOCUMENTS 2,457,228 A * 12/1948 Hanna ..................... B63B 29/12
318/489
6,473,517 B1 * 10/2002 Tyan .................... G06V 30/153
382/105

(Continued)

FOREIGN PATENT DOCUMENTS

| JP | 2006059202 A | * | 3/2006 | ............. G01C 11/00 |
| KR | 101468159 B1 | * | 12/2014 | ............. H04N 19/27 |
| WO | WO-2004113836 A1 | * | 12/2004 | ............. G01C 11/00 |

OTHER PUBLICATIONS

Jiebo Luo and M. Boutell, "Automatic image orientation detection via confidence-based integration of low-level and semantic cues," in IEEE Transactions on Pattern Analysis and Machine Intelligence, vol. 27, No. 5, pp. 715-726, May 2005, doi: 10.1109/TPAMI.2005.96. (Year: 2005).*

(Continued)

*Primary Examiner* — Charles T Shedrick
(74) *Attorney, Agent, or Firm* — Dority & Manning, P.A.

(57) ABSTRACT

Systems and methods for adjusting an image are provided. In one example embodiment, a computer-implemented method includes obtaining data representing an image. The method includes inputting the image into a machine learned model. The method includes obtaining, in response to inputting the image into the machine learned model, an output of the machine learned model that includes an estimated tilt of the image. The method includes correcting a tilt of the image based at least in part on the estimated tilt obtained from the machine learned model.

17 Claims, 11 Drawing Sheets

(56) References Cited

U.S. PATENT DOCUMENTS

| | | | | |
|---|---|---|---|---|
| 6,671,391 | B1* | 12/2003 | Zhang | G06V 40/161 382/118 |
| 8,136,167 | B1 | 3/2012 | Gossweiler, III | H04N 1/00347 382/296 |
| 10,616,443 | B1* | 4/2020 | Lund | G06N 3/08 |
| 2002/0181802 | A1* | 12/2002 | Peterson | G06T 3/005 382/284 |
| 2003/0099395 | A1* | 5/2003 | Wang | G06V 10/242 382/165 |
| 2009/0304301 | A1* | 12/2009 | Hattori | H04N 5/772 382/275 |
| 2010/0104220 | A1* | 4/2010 | Gossweiler, III | G06V 10/242 382/296 |
| 2011/0182503 | A1* | 7/2011 | Free | G06V 40/162 382/163 |
| 2014/0140609 | A1* | 5/2014 | Krishnaswamy | G06T 7/70 382/199 |
| 2017/0091619 | A1* | 3/2017 | Towal | G06N 3/047 |
| 2017/0330337 | A1* | 11/2017 | Mizutani | G06T 3/4038 |
| 2018/0343388 | A1* | 11/2018 | Matsushita | H04N 23/698 |
| 2019/0026538 | A1* | 1/2019 | Wang | G06V 10/764 |
| 2021/0306517 | A1* | 9/2021 | Lund | G06N 20/00 |

OTHER PUBLICATIONS

Fisher et al, "Image Orientation Estimation with Convolutional Networks", European Conference on Computer Vision, Amsterdam, The Netherlands, Oct. 8-16, 2016, 11 pages.

International Search Report for PCT/US2017/066752 dated Mar. 16, 2018, 13 pages.

Olmschenk et al, "Pitch and Roll Camera Orientation from a Single 2D Image Using Convolutional Neural Networks", 8 pages.

* cited by examiner

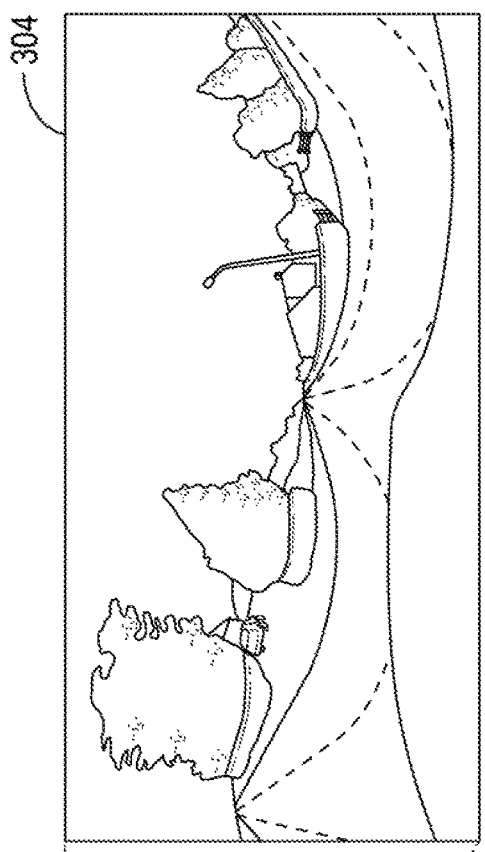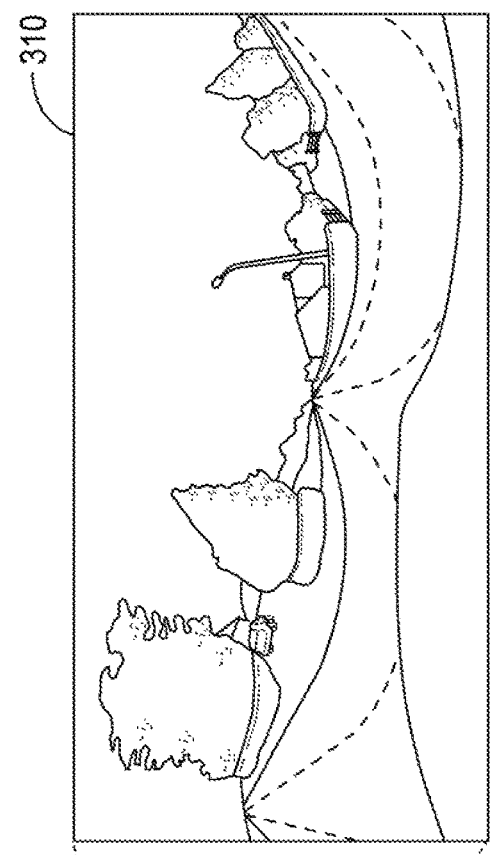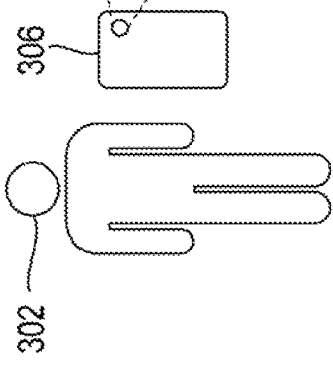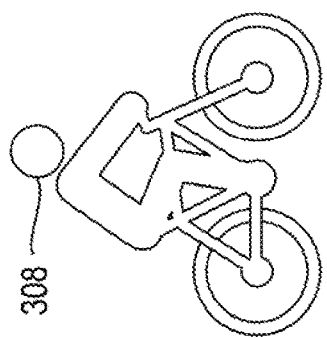
FIG. 3A
FIG. 3B

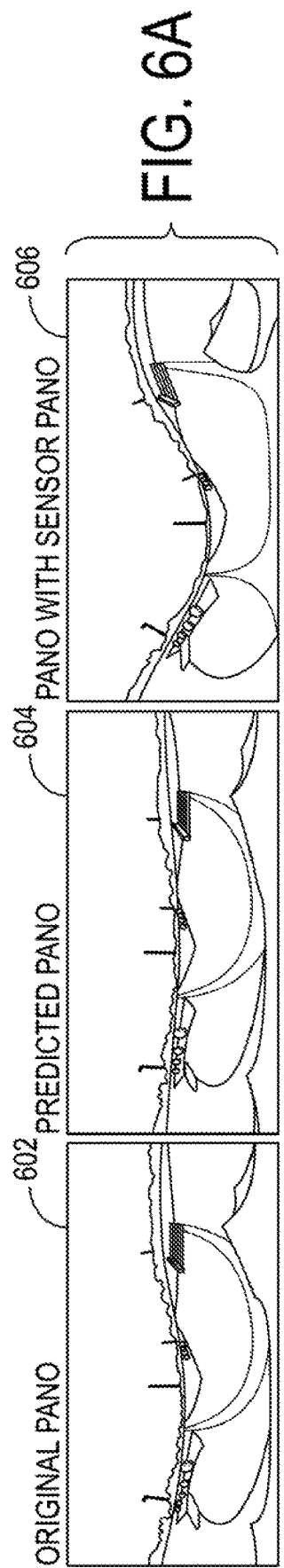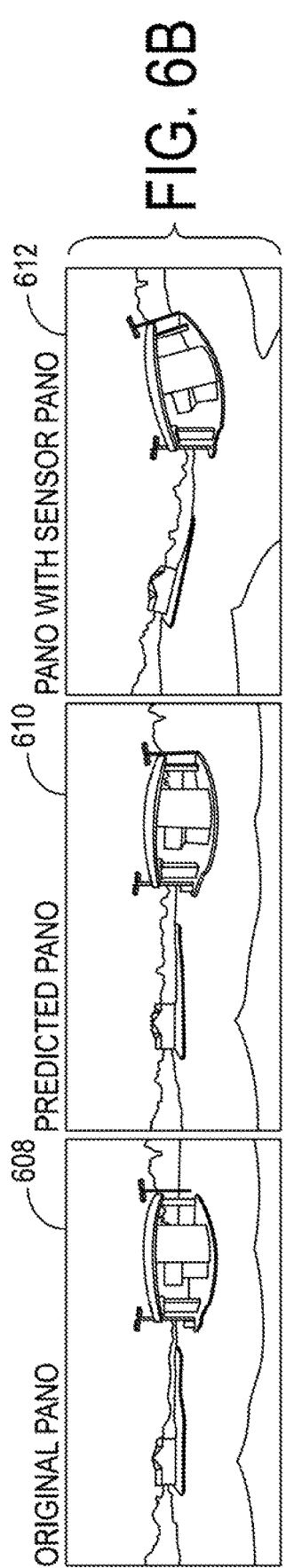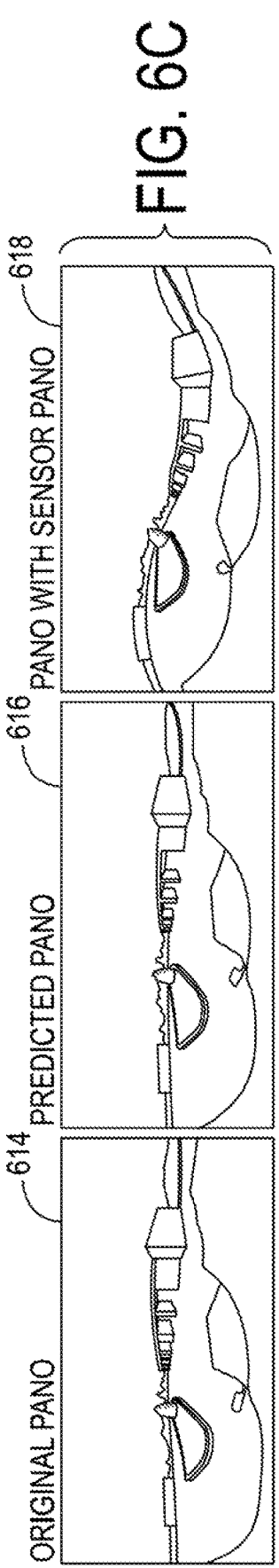

SYSTEMS AND METHODS FOR LEVELING IMAGES

PRIORITY CLAIM

The present application is based upon and claims the right of priority under 35 U.S.C. § 371 to International Application No. PCT/US2017/066752 filed Dec. 15, 2017, which claims the benefit of priority of U.S. Provisional Patent Application No. 62/568,976 filed Oct. 6, 2017, entitled "Systems and Methods for Leveling Images". Applicant claims priority to and the benefit of each of such applications and incorporates all such applications herein by reference in their entirety.

FIELD

The present disclosure relates generally to adjusting a digital image.

BACKGROUND

With the growth of camera phones and consumer 360° cameras, there is an increasing amount of user generated image content that is available. These cameras can capture a scene with various fields of views (e.g., default, panoramic, full sphere) and use accelerometers to capture a pitch and/or roll of the camera while in use. The term "tilt" is used here to mean distortion in an image captured by the camera due to pitch and/or roll of the camera. By capturing the pitch and/or roll of a camera while the camera is in use, it can be possible to correct a tilt of an image generated by the camera. However, a captured pitch and/or roll of a camera may not be accurate. For example, a captured pitch and/or roll of a camera can often have an error of +/−10 to +/−15 degrees, especially if captured when the camera is moving, due to additional acceleration side to side.

One possible solution to the above described problem is using computer vision algorithms to detect lines and/or seams in a camera image, and aligning the image based on the detected lines and/or seams. However, this approach works well only on very specific scenes (e.g., scenes with axis aligned buildings, scenes with axis aligned walls, etc.).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to adjust an image. The method includes obtaining, by a computing system, data representing an image. The method includes inputting, by the computing system, the image into a machine learned model. The method includes obtaining, by the computing system, in response to inputting the image into the machine learned model, an output of the machine learned model that includes an estimated tilt of the image. The method includes correcting, by the computing system, a tilt of the image based at least in part on the estimated tilt obtained from the machine learned model. Thus, the disclosure has the technical effect of making it possible to produce images which are less subject to distortion due to roll and/or pitch.

Another example aspect of the present disclosure is directed to a computer-implemented method to perform machine learning. The method includes generating, by a computing system, a plurality of training images having a known tilt, and training, by the computing system, a machine learned model to output an estimated tilt of an input image based at least in part on the plurality of training images.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A and 3B depict example user generated images, according to example embodiments of the present disclosure;

FIGS. 6A-6C depict example corrected images, according to example embodiments of the present disclosure;

Figure 1A:
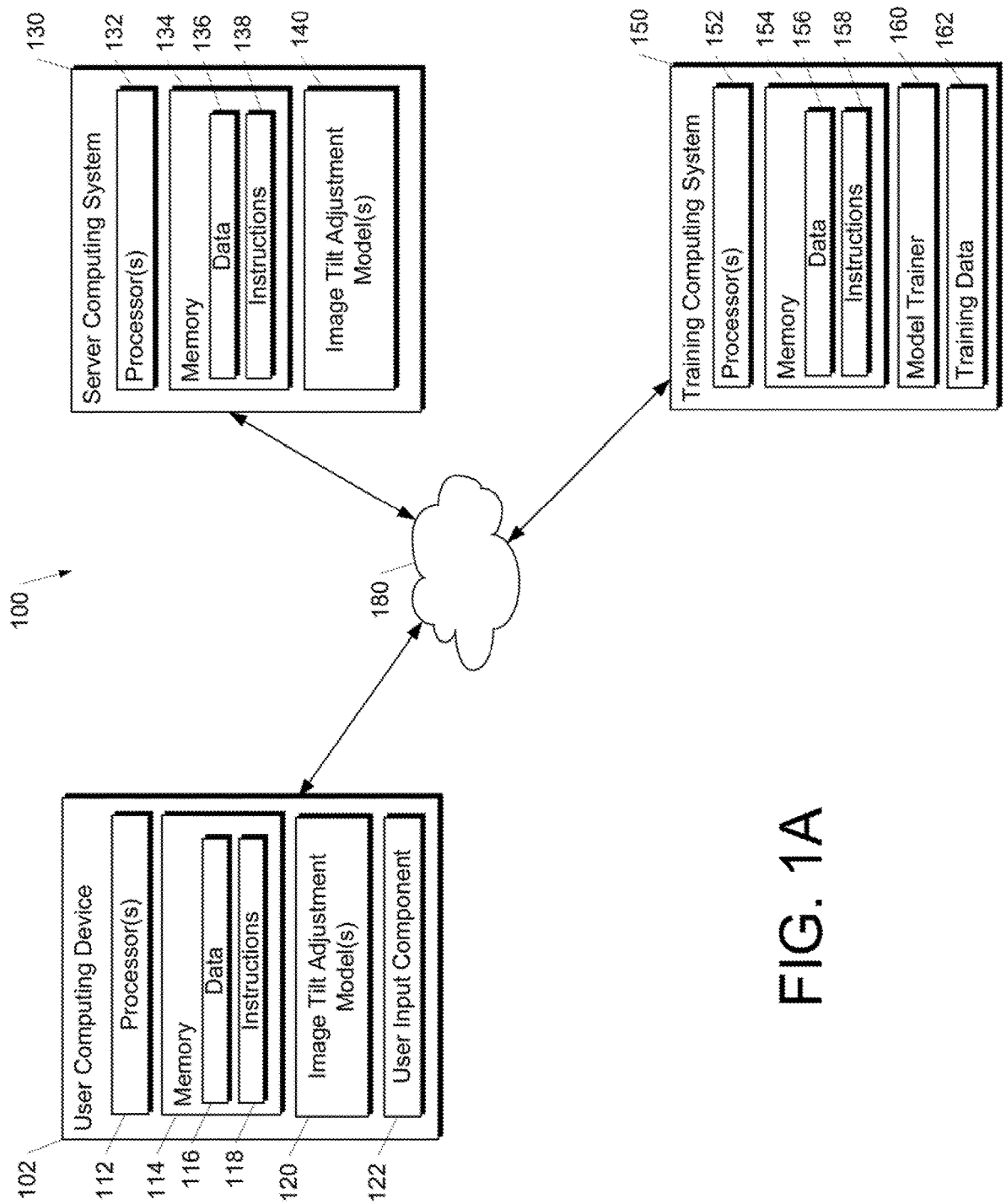
FIGS. 1A, 1B, and 1C depict block diagrams of an example computing system that performs an image tilt adjustment according to example embodiments of the present disclosure.

Reference numerals that are repeated across plural figures are intended to identify the same components or features in various implementations.

DETAILED DESCRIPTION

Example aspects of the present disclosure are directed to using a machine learning based approach to determine a tilt (e.g., pitch and/or roll) of an image, and correcting the tilt based on the determination. In particular, example aspects of the present disclosure are directed to systems and methods for automatically determining a tilt of an image using a machine learned model. The machine learned model can receive an image as an input, and provide an estimated pitch and/or roll associated with the image (e.g., an estimated pitch and/or roll of a camera used to generate the image) as an output. Systems and methods in accordance with the present disclosure can use the estimated pitch and/or roll to correct the tilt of the input image. In this way, the present disclosure can provide for correcting a tilt that may not be inferred from detecting lines and/or seams in an image. In addition, the present disclosure enables greater flexibility by eliminating the requirement of defining rigid standards for what constitutes a "normal" tilt.

In some implementations, the machine learned model can be a machine learned neural network. As an example, the machine learned model can be convolutional neural network (CNN). The CCN can be based on the VGG-19 architecture, and use the Adam Optimizer at a 0.0001 learning rate to minimize a mean square error between an estimated pitch and/or roll and an actual pitch and/or roll. As another example, the machine learned model can be based on an architecture such as AlexNet, Inceptionv3, VGG, and various variants.

According to an aspect of the present disclosure, in some implementations, the machine learned model can be used in a pose pipeline to predict a pitch and/or roll associated with an image, instead of, or in addition to, using accelerometer or other sensor data to capture a pitch and/or roll of a camera. For example, a machine learned model can be used in a pose pipeline that is included in a bundling operation on an image set. A bundling operation can include extracting features from each image in the image set to determine a pose for the image set. A pose for the image set can include a pitch and or roll for the image set, such that each image in the image set is aligned with respect to the pitch and or roll for the image set. The pose for the image set can be determined by extracting, for each image in the image set, a pitch and/or roll associated with the image. The pitch and/or roll associated with the image can be determined based on accelerometer or other sensor data of a camera used to generate the image. Additionally, or alternatively, each image in the image set can be input into the machine learned model to obtain an estimated pitch and/or roll associated with the image, and optionally a confidence level for the estimated pitch and/or roll (discussed below).

According to an aspect of the present disclosure, an estimated pitch and/or roll output by the machine learned model for an input image can be used as a replacement for a captured pitch and/or roll associated with the input image. Additionally, or alternatively, the estimated pitch and/or roll output by the machine learned model can be combined with a captured pitch and/or roll associated with the image. For example, an estimated pitch value for an image can be averaged (e.g., using a weighted average) with a captured pitch value for the image and/or an estimated roll value for the image can be averaged (e.g., a weighted average) with a captured roll value for the image.

According to an aspect of the present disclosure, an estimated pitch and/or roll for an image can be stored in association with the image. For example, an estimated pitch and/or roll value for an image can be stored as metadata for the image. As another example, an estimated pitch and/or roll value for an image can be stored in an associative database as a property associated with the image.

According to an aspect of the present disclosure, an estimated tilt (e.g., pitch and/or roll) for an image can be used to correct the tilt of the image. For example, an image can be distorted based on an estimated pitch and/or roll associated with the image to correct a tilt associated with the image. In some implementations, the corrected image can be displayed on a display device. In some implementations, a confidence level of an estimated tilt can be compared with a threshold value. The estimated tilt can be stored and/or used to correct the image if, for example, the confidence level is equal to or greater than the threshold value.

In some implementations, the machine learned model can use a Gaussian log likeliness loss function to predict a mean and a variance, instead of a single estimated pitch and/or roll value for an input image. By using the Gaussian log likeliness loss function, the machine learned model can output a range of values in which the model believes the true pitch and/or roll values lie. In some implementations, the variance can be represented as a logarithmic value (e.g., log(variance), ln(variance)). For example, a machine learned model can determine an average pitch and/or an average roll value by averaging a range of values in which the model believes the true pitch and/or roll value lie. The machine learned model can output the average pitch and/or average roll value. The machine learned model can also determine a variance based on the range of values. The machine learned model can output the variance together with the average pitch and/or average roll value. In some implementations, a variance (e.g., log(variance), ln(variance)) output by the machine learned model can be interpreted as a confidence level of the machine learned model with respect to an estimated mean value (e.g., estimated average pitch and/or estimated average roll). For example, a smaller variance can indicate higher confidence in the estimated mean values, and a larger variance can indicate a lower confidence in the estimated mean values.

In some implementations, the confidence level can be used to filter input images for which the machine learned model has low confidence that the pitch and/or roll output by the machine learned model is correct. For example, a sqrt(e^log(variance)) can be calculated so that a standard deviation is in the range $(0, \infty)$, and a threshold value can be set for the confidence level within $(0, \infty)$. The machine learned model can use the confidence level and the threshold value to filter out input images that the model may have trouble with making an accurate estimate. In this way, the confidence metric can reduce an error margin of the machine learned model, i.e. as measured on the remaining input images. For example, when a distortion range is made wider (e.g., −15 to +15 degrees, −20 to +20 degrees, etc.), an osculation of a distorted image is also more extreme, resulting in a higher margin of error. By using the confidence level to filter out input images, the machine learned model can yield an error margin as low as +/−5 degrees on the remaining images, thus increasing an accuracy of the machine learned model on user generated content (e.g., images generated by a camera phone, consumer 360 degree camera, etc.).

According to an aspect of the present disclosure, one or more machine learned models can be trained, such that each machine learned model corresponds to a particular field of view (e.g., default, panoramic, full sphere). For example, a machine learned model trained using training images having a default field of view can be used to predict a tilt of an input image having the default field of view, a machine learned model trained using training images having a panoramic field of view can be used to predict a tilt of an input image having the panoramic field of view, and a machine learned model trained using training images having a full sphere field of view (e.g., 360 degrees) can be used to predict a tilt of an input image having the full sphere field of view.

According to an aspect of the present disclosure, a machine learned model can be trained using a training set. The training set can include a plurality of training images with a respective known tilt. For example, a training set can include a plurality of images generated by a professional-grade camera that is calibrated to capture accurate pitch and/or roll measurements when in use (e.g., a Rico Theta camera). As another example, a training set can include a plurality of images that are captured and then distorted based on a predetermined pitch and/or roll value.

According to an aspect of the present disclosure, one or more training images of the training set can be generated by applying one or more distortions (e.g., color space adjustment, resolution scaling, pitch and/or roll adjustments, etc.) to a set of preexisting images (e.g. which may optionally also be included in the training set). For example, a plurality of preexisting images can be converted to monochrome/greyscale by adjusting a color space of the images. As another example, a plurality of preexisting images can be scaled to a resolution of 480×240 pixels. As yet another example, a plurality of preexisting images can be tilted by adjusting a pitch and/or roll associated with the images.

In some implementations, the pitch and/or roll adjustment can be based on a pitch and/or roll value selected from a range of pitch and/or roll values, respectively. For example, a pitch and/or roll value can be an integer value selected from a predetermined range of −10 to +10 degrees. As another example, a pitch and/or roll value can be selected from a predetermined range of −20 to +20 degrees, −30 to +45 degrees, −70 to +60 degrees, −90 to +90 degrees, etc. As yet another example, a pitch and/or roll value can be a non-integer value selected from a predetermined range.

In some implementations, a pitch and/or roll value selected to adjust a preexisting image can be selected randomly from a uniform distribution of pitch and/or roll values within a predetermined range.

In some implementations, an additional yaw distortion can be applied to the preexisting images. The yaw distortion for each preexisting image can be based on a pitch and/or roll value used to distort the preexisting image. For example, a unique yaw distortion can be applied to each pitch and/or roll value configuration applied to the preexisting images.

Optionally, multiple training images may be created for each preexisting image, by applying respect pitch and/or roll distortions. Conversely, in some implementations, each preexisting image can be used to generate a small number of corresponding training images of the training set by applying respective pitch and/or roll distortions. For example, only one training image may be generated per pre-existing image. This can allow the machine learned model to focus on the distortion in the training images rather than the content of the preexisting images.

According to an aspect of the present disclosure, the training set can be input into the machine learned model, and in response, the machine learned model can output an estimated pitch and/or roll for each image in the training set. The estimated pitch and/or roll value for each image in the training set can be compared to a known tilt (pitch and/or roll) associated with such image, to determine an error between the estimated pitch and/or roll and the known pitch and/or roll associated with such image. For example, a mean squared error loss function can be used to determine the error. The machine learned model can be trained to minimize the error (e.g., to minimize a sum of all errors across the entire training set).

In some implementations, a computing system can include a user computing device and/or a server computing device. For example, user computing device can include a camera, a camera-enabled computing device, a smartphone, tablet, laptop, desktop, smart device, embedded device, or other form of computing device. In some implementations, the user computing device can include and/or implement the machine learned model. In some implementations, the server computing device can include and/or implement the machine learned model.

In some implementations, a training computing system can train the machine learned model. The training computing system can include a user computing device, a server computing device, and/or other computing devices. In some implementations, the training computing system can include a model trainer that trains the machine learned model using various training or learning techniques, such as, for example, backwards propagation of errors. The model trainer can perform a number of generalization techniques (e.g., weight decays, dropouts, etc.) to improve the generalization capability of the models being trained. The model trainer includes computer logic utilized to provide desired functionality. The model trainer can be implemented in hardware, firmware, and/or software controlling a general purpose processor. For example, in some implementations, the model trainer includes program files stored on a storage device, loaded into a memory and executed by one or more processors. In other implementations, the model trainer includes one or more sets of computer-executable instructions that are stored in a tangible computer-readable storage medium such as RAM hard disk or optical or magnetic media.

A computing device can include one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor(s) to cause the computing device to perform operations. In some implementations, the disclosure provides a computer program product (e.g. a computer program recorded on a non-transitory computer-readable storage medium, or computer program which is downloadable over a communication network without necessarily being recorded on a non-transitory storage medium) containing program instructions which, when implemented by a processor, cause the processor to perform one of the methods disclosed above.

With reference now to the FIGS., example embodiments of the present disclosure will be discussed in further detail.

FIG. 1A depicts a block diagram of an example computing system 100 that performs image tilt adjustment according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more image tilt adjustment models 120. For example, the image tilt adjustment models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example image tilt adjustment models 120 are discussed with reference to FIGS. 2-7.

More particularly, the image tilt adjustment model 120 can receive an image as an input, and provide an estimated tilt (e.g., estimated pitch and/or roll) associated with the image (e.g., an estimated pitch and/or roll of a camera used to generate the image) as an output. In some implementations, the image tilt adjustment model can predict a mean and a variance, instead of a single estimated pitch and/or roll value for an input image. In some implementations, a variance output by the image tilt adjustment model can be interpreted as a confidence level with respect to an estimated tilt of an input image (e.g., estimated average pitch and/or estimated average roll). In some implementations, the confidence level can be used to filter input images for which the machine learned model has low confidence.

Additionally or alternatively, one or more image tilt adjustment models 140 can be included in or otherwise stored and implemented by the server computing system 130 that communicates with the user computing device 102 according to a client-server relationship. For example, the image tilt adjustment models 140 can be implemented by the server computing system 130 as a portion of a web service (e.g., an image tilt adjustment service). Thus, one or more models 120 can be stored and implemented at the user computing device 102 and/or one or more models 140 can be stored and implemented at the server computing system 130.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image tilt adjustment models 120 and/or 140 based on a set of training data 162. The training data 162 can include, for example, a plurality of training images with a known tilt. The known tilt can be determined based on a captured tilt, and/or based on a predetermined tilt used to distort the plurality of preexisting images.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
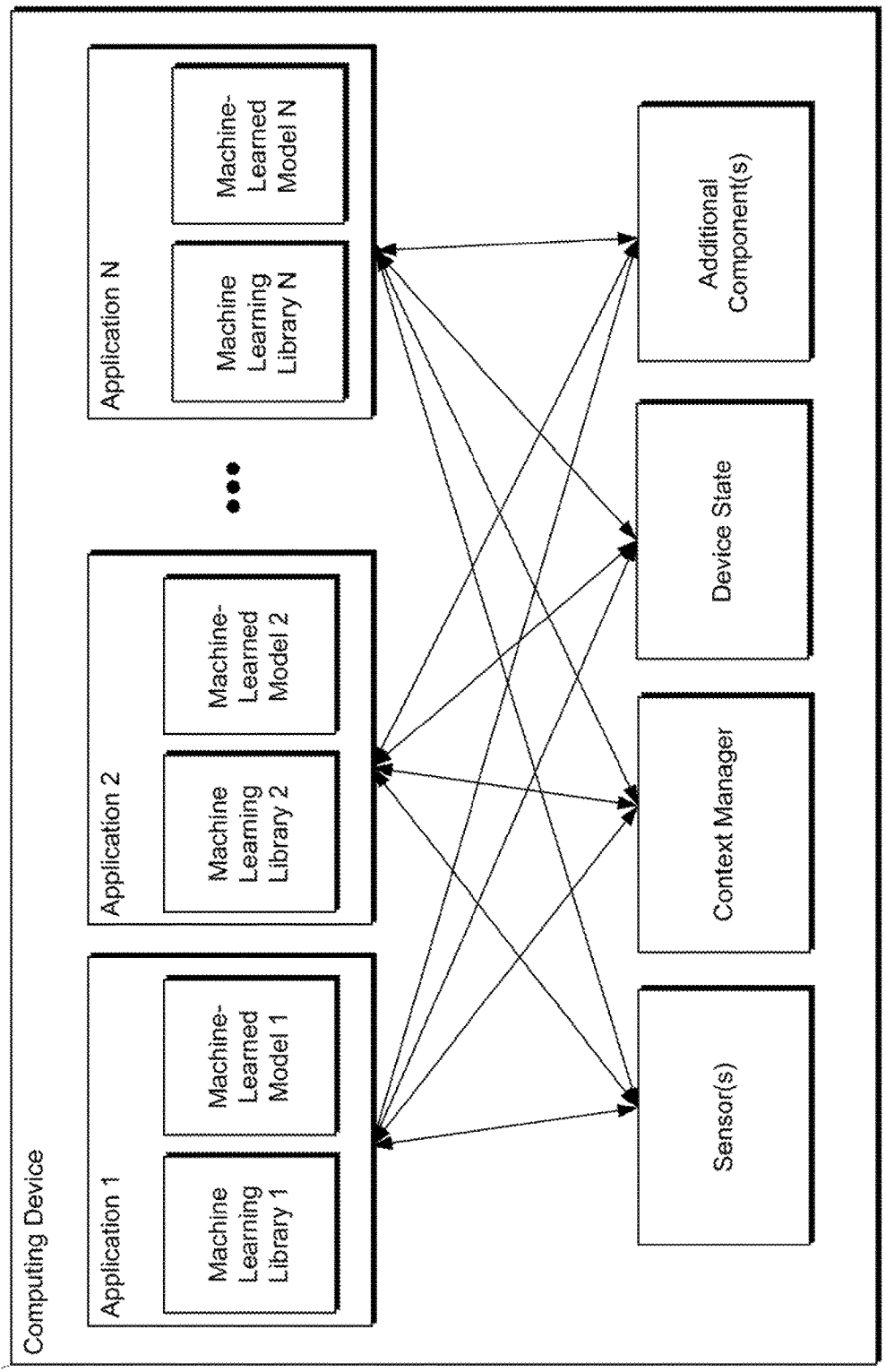

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
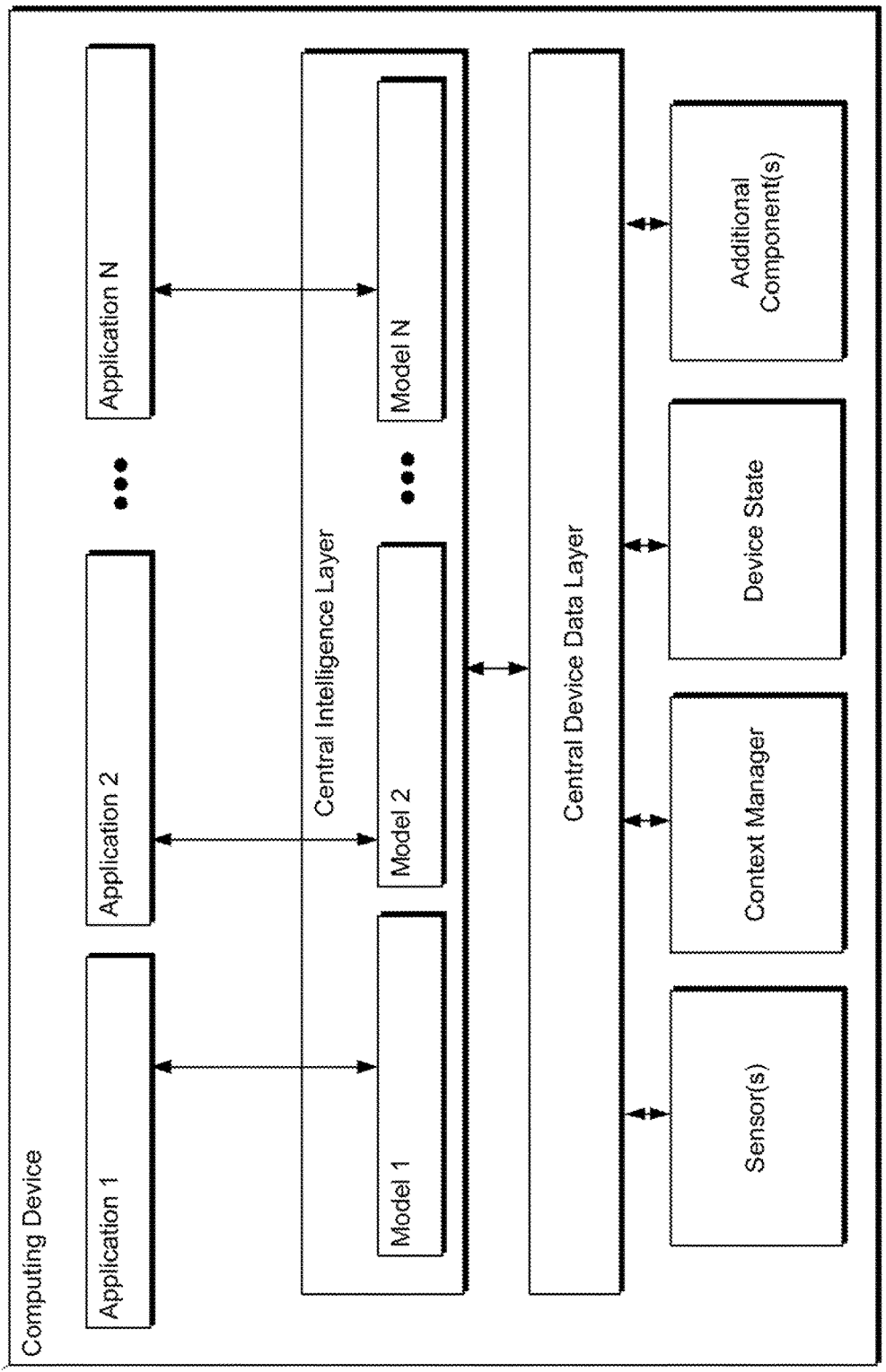

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
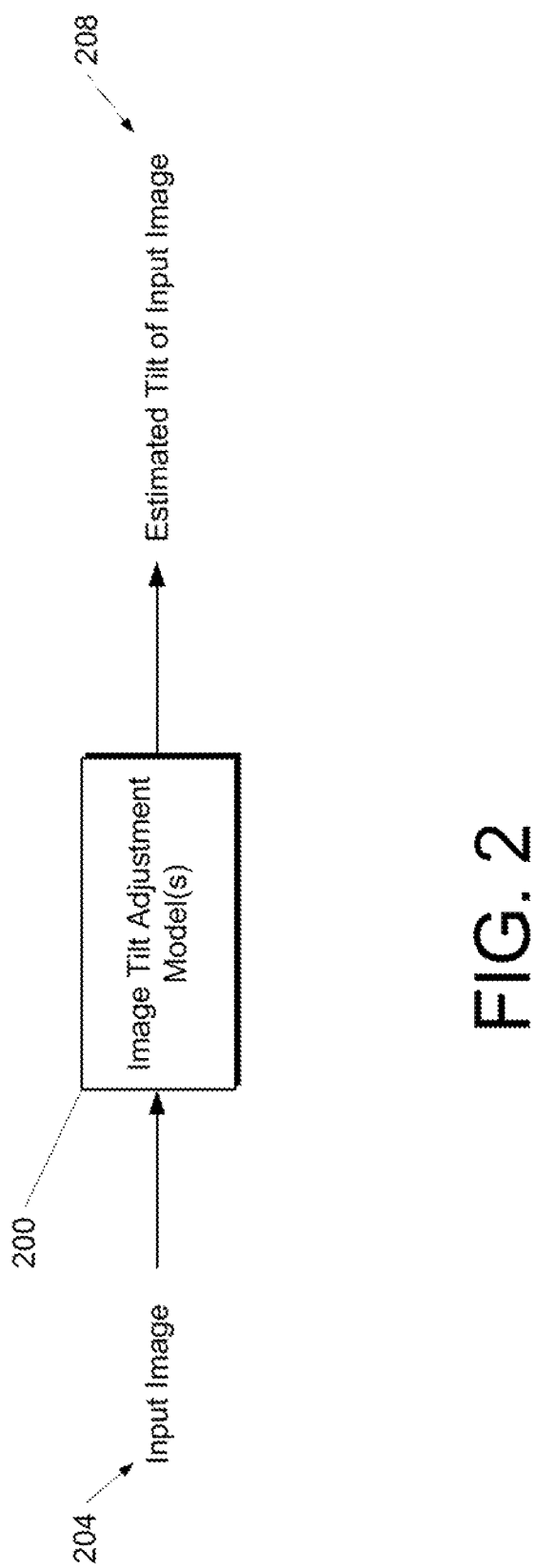
FIG. 2 depicts a block diagram of an example image tilt adjustment model according to example embodiments of the present disclosure.

FIG. 2 depicts a block diagram of an example image tilt adjustment model 200 according to example embodiments of the present disclosure. In some implementations, the image tilt adjustment model 200 is trained to receive data representing an input image 204 and, as a result of receipt of the input image 204, provide data representing an estimated tilt of the input image 208.

FIGS. 3A-3B depict an example of a user generated panoramic image, according to example embodiments of the present disclosure. As shown in FIG. 3A, a stationary user 302 can use a camera 306 (e.g., a camera phone) to generate a panoramic image 304. As shown in FIG. 3B, a bicycling user 308 can use the camera 306 to generate a panoramic image 310. The camera 306 can capture a first pitch and/or tilt associated with the panoramic image 304 and a second pitch and/or tilt associated with the panoramic image 310. The first pitch and/or tilt that is captured when the camera 306 is stationary can be more accurate than the second pitch and/or tilt that is captured when the camera 306 is in motion.

Figure 4A:
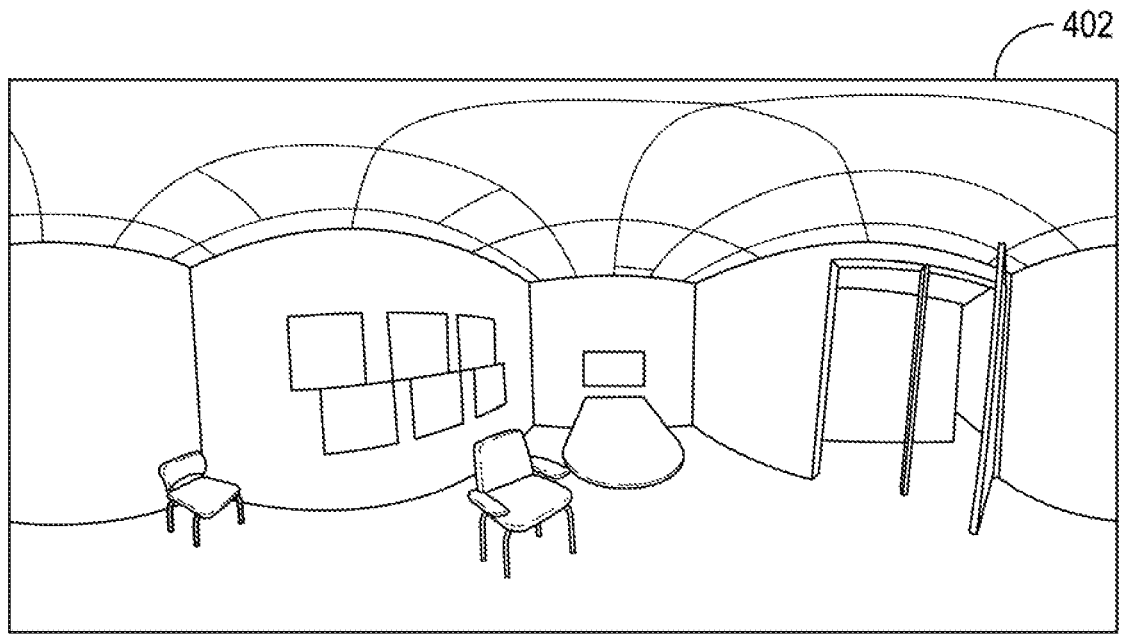
FIGS. 4A and 4B depict example training images, according to example embodiments of the present disclosure.
Figure 4B:
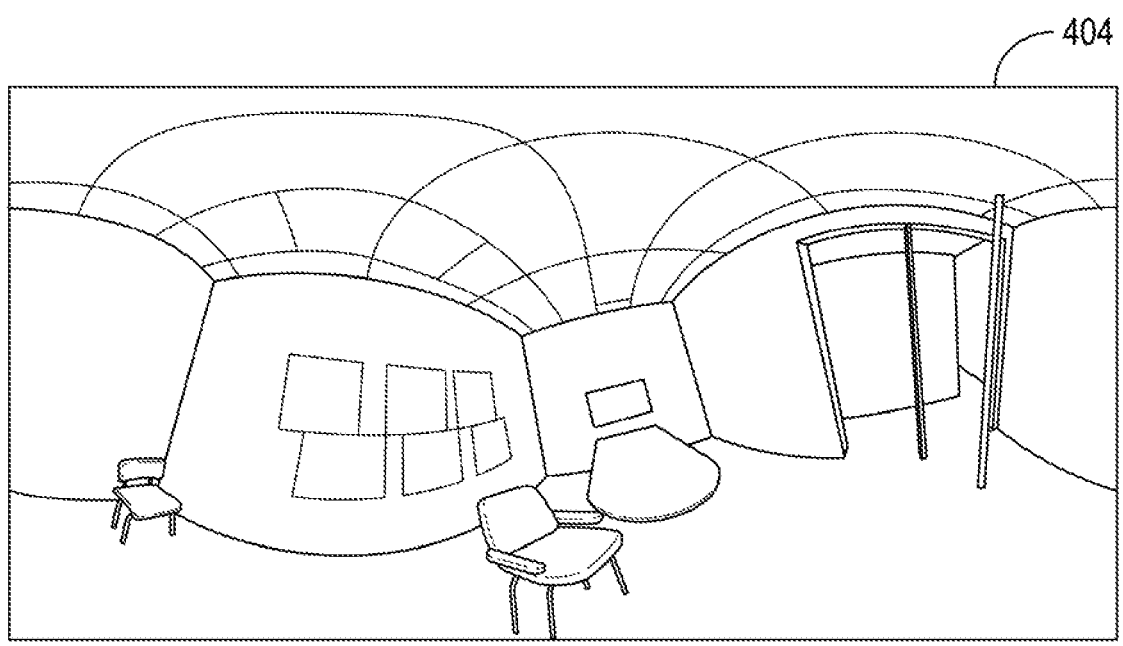

FIGS. 4A-4B depict an example training image, according to example embodiments of the present disclosure. As shown in FIG. 4A, a training image 402 can be included in a training set for training a machine learned model. The training image 402 can have a known tilt of zero. The training image 402 can be input into the image tilt adjustment model 200 to obtain an estimated tilt of the training image 402. The estimated tilt of the training image 402 can be compared with the known tilt to determine an error.

As shown in FIG. 4B, a training image 404 can be included in a training set. The training image 404 can be the training image 402 (or another preexisting image) with one or more distortions applied to it. In particular, the training image 404 can be the training image 402 (or another preexisting image) converted to monochrome with a predetermined pitch and/or roll adjustment applied. The training image 404 can be input into the image tilt adjustment model 200 to obtain an estimated tilt of the training image 404. The estimated tilt of the training image 404 can be compared with the predetermined pitch and/or roll applied to the image to determine an error.

Figure 5:
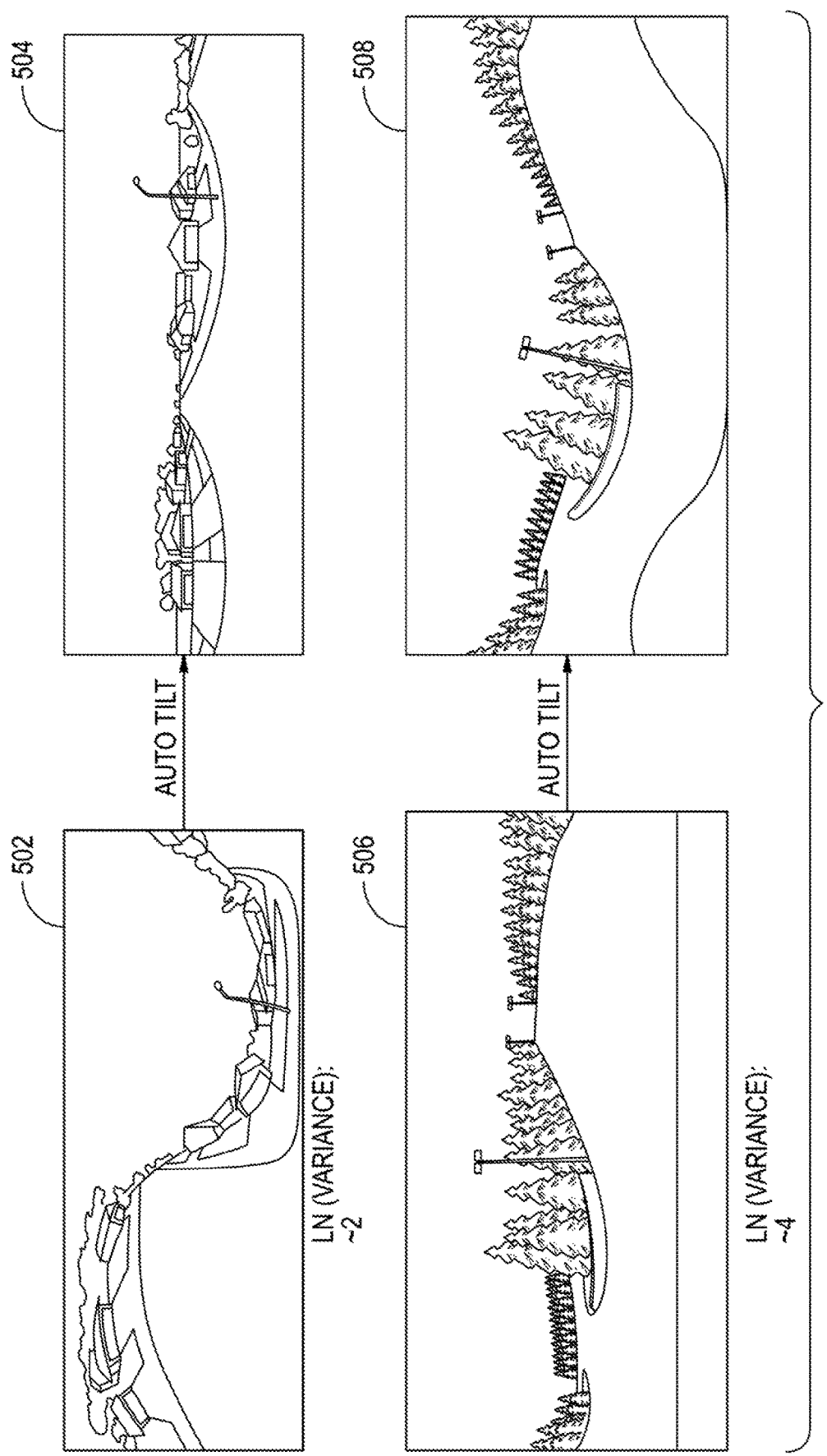
FIG. 5 depicts an example of correcting a tilt of an image, according to example embodiments of the present disclosure.

FIG. 5 depicts an example of filtering an input image using a confidence metric, according to example embodiments of the present disclosure. When an image 502 is input into the image tilt adjustment model 200, the image tilt adjustment model can output an estimated tilt for the image 502 and a variance for the estimated tilt for the image 502. Additionally, when an image 506 is input into the image tilt adjustment model 200, the image tilt adjustment model can output an estimated tilt for the image 506 and a variance for the estimated tilt for the image 506. The natural log of the variance for the image 502 can be lower than the natural log of the variance for the image 506, indicating that the image tilt adjustment model 200 has a higher confidence in the estimated tilt for the image 502 than the estimated tilt for the image 506. The image 502 can be corrected based on the estimated tilt of the image 502 output by the machine learned model to generate the image 504, and the image 506 can be corrected based on the estimated tilt of the image 506 output by the machine learned model to generate the image 508. As shown in FIG. 5, when the image 502 is corrected based on an estimated tilt with a high confidence, a tilt of the image 502 is substantially removed in the image 504, but when the image 506 is corrected based on an estimated tilt with a low confidence, a tilt of the image 506 is not substantially removed in the image 508.

FIGS. 6A-6C depict examples of correcting a tilt in a panoramic image, according to example embodiments of the present disclosure. As shown in FIG. 6A, an input image 602 can be input into the machine learned model to generate image 604 that is corrected based on an estimated tilt output by the machine learned model. The image 604 appears more correct than an image 606 that is corrected based on a captured pitch and/or roll associated with the image 602. As shown in FIG. 6B, an input image 608 can be input into the machine learned model to generate image 610 that is corrected based on an estimated tilt of the machine learned model. The image 610 appears more correct than the image 612 that is corrected based on a captured pitch and/or roll associated with the image 608. As shown in FIG. 6C, an input image 614 can be input into the machine learned model to generate image 616 that is corrected based on an estimated tilt of the machine learned model. The image 616 appears more correct than the image 618 that is corrected based on a captured pitch and/or roll associated with the image 614.

Figure 7:
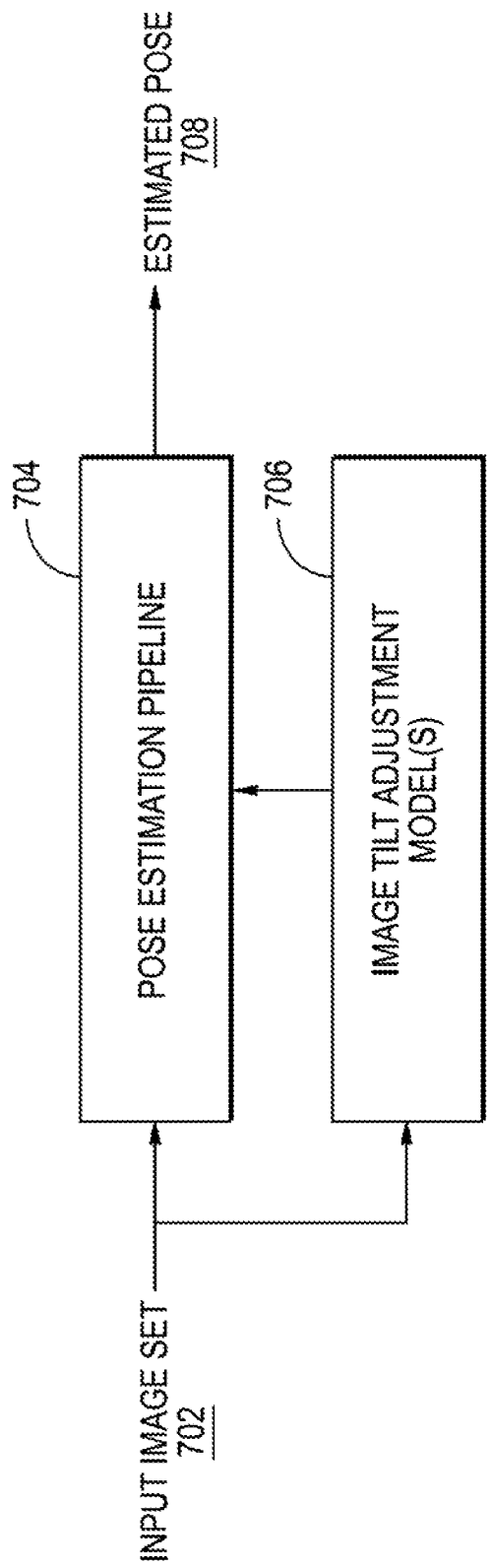
FIG. 7 depicts an example of using an image tilt adjustment model in a pose estimation pipeline, according to example embodiments of the present disclosure.

FIG. 7 depicts an example of adding a machine learned model in a pose pipeline, according to example embodiments of the present disclosure. As shown in FIG. 7, the image tilt adjustment model 706 can be used in a pose estimation pipeline 704 to predict a pitch and/or roll 708 associated with an image, instead of, or in addition to, using a captured pitch and/or roll associated with the image. The input image set 702 can include a plurality of input images. A pose for the image set can include a pitch and/or roll for the image set, such that each image in the image set is aligned with respect to the pitch and/or roll for the image set. The pose for the image set can be determined by extracting, for each image in the image set, a pitch and/or roll associated with the image, by the pose estimation pipeline 704. Each image in the image set can be input into the machine learned model to obtain an estimated pitch and/or roll associated with the image that can be provided to the pose estimation pipeline 704 to determine the estimated pose 708.

Figure 8:
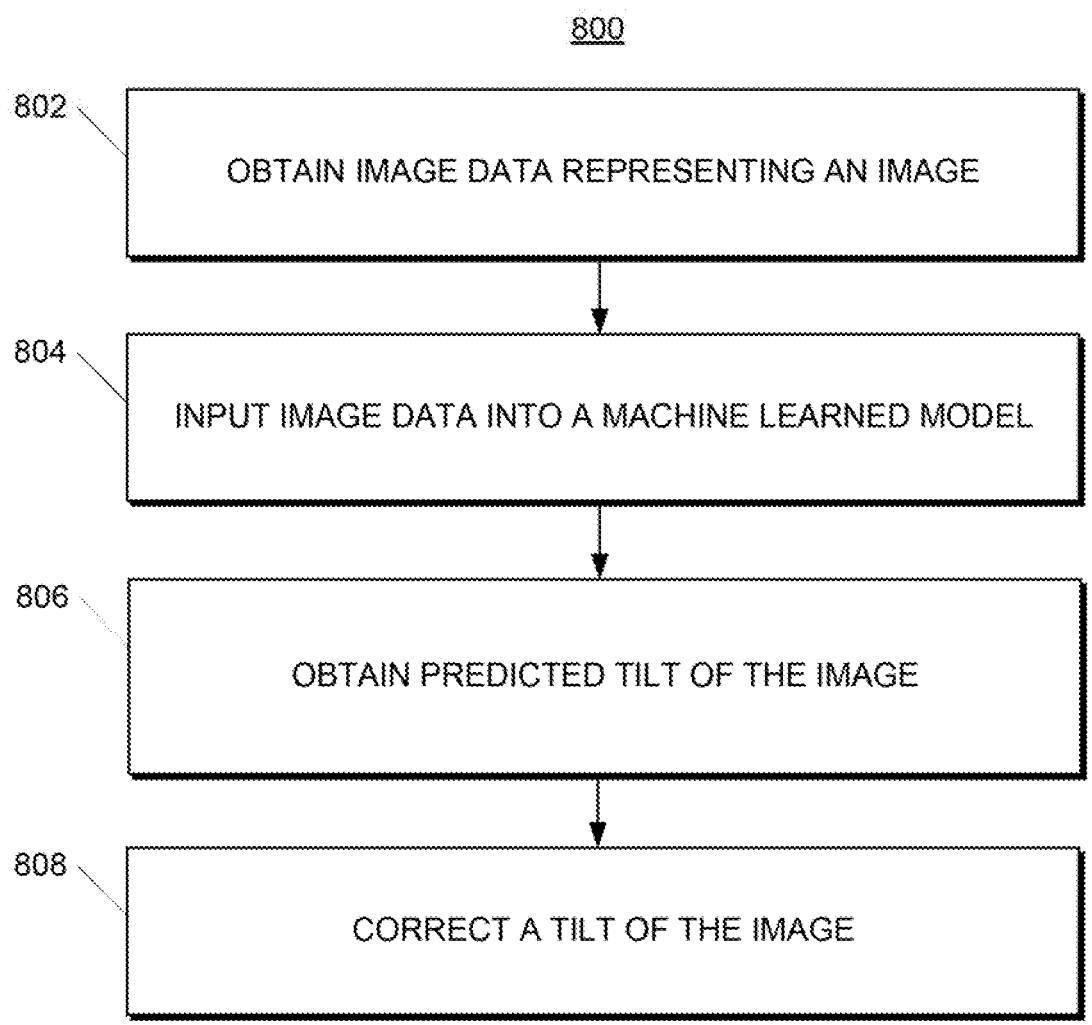
FIG. 8 depicts a flow chart diagram of an example method of adjusting an image according to example embodiments of the present disclosure.
Figure 9:
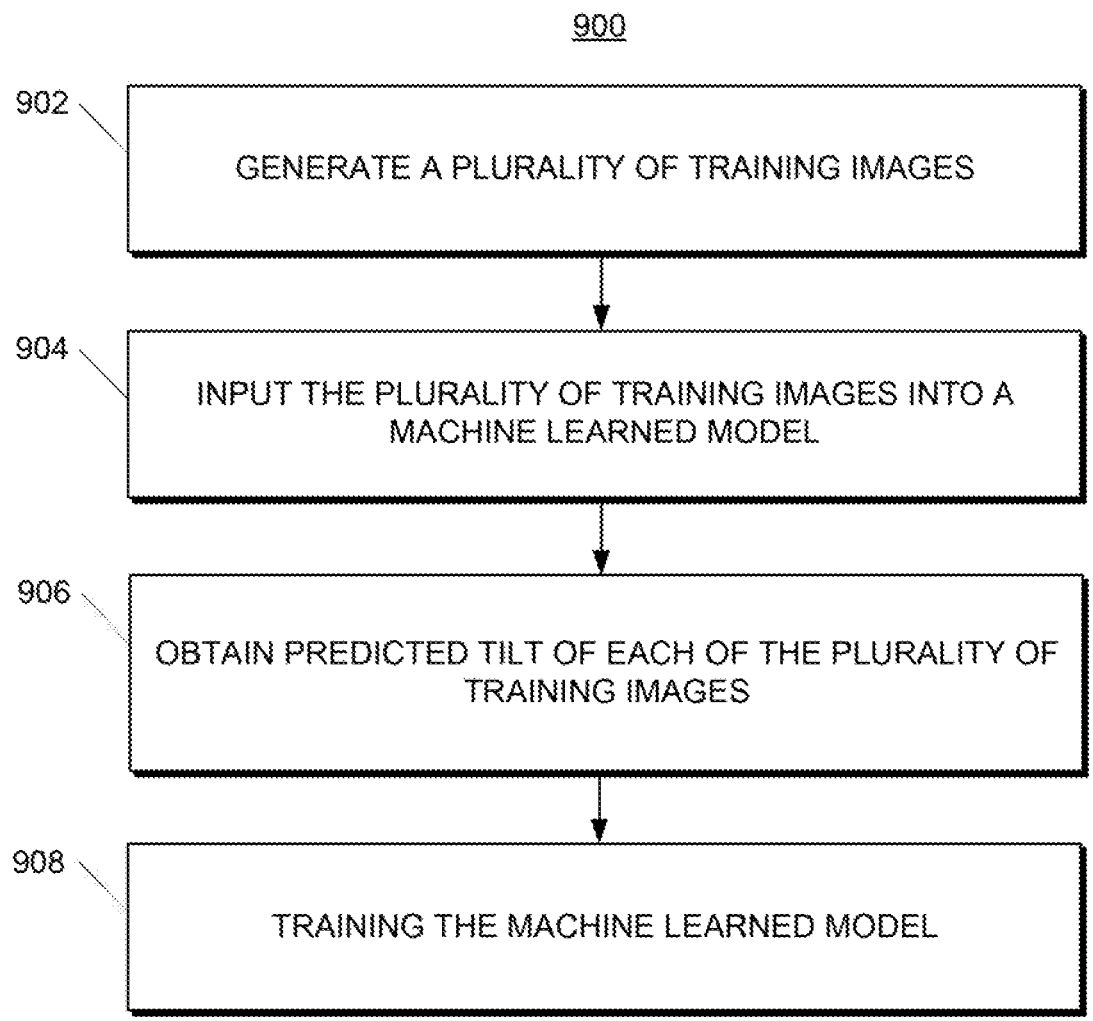
FIG. 9 depicts a flow chart diagram of an example method of training a machine learned model according to example embodiments of the present disclosure.

FIGS. 8 and 9 depict flow diagrams of example methods 800 and 900 for adjusting an image and performing machine learning, respectively, according to example embodiments of the present disclosure. One or more portion(s) of the methods 800 and 900 can be implemented as operations by one or more computing system(s) such as, for example, the computing system(s) 10, 50, 102, 130, and 150 shown in FIGS. 1A, 1B, and 1C. Moreover, one or more portion(s) of the methods 800 and 900 can be implemented as an algorithm on the hardware components of the system(s) described herein (e.g., as in FIGS. 1A, 1B, and 1C) to, for example, adjust an image.

FIG. 8 depicts a diagram of a method 800 for adjusting an image. At (802), the method 800 includes obtaining image data representing an image. For example, the user computing device 102 can obtain image data representing an image 204 using a camera.

At (804), the method 800 includes inputting the image into a machine learned model. For example, the user computing device 102 can input the image 204 into the image tilt adjustment model 200.

At (806), the method 800 includes obtaining an estimated tilt of the image. For example, the user computing device 102 can obtain from the image tilt adjustment model 200 an estimated tilt of the input image 208. In some implementations, the user computing device 102 can obtain at least one of an estimated pitch and an estimated roll associated with the image 204. In some implementations, the user computing device 102 can obtain a confidence level representing a likelihood that the at least one of the estimated pitch and estimated roll are accurate according to a (typically predefined) accuracy criterion (such as differing from the true value by less than predefined amount). In some implementations, the estimated pitch associated with the image corresponds to a pitch associated with a camera used to generate the image. In some implementations, the estimated roll associated with the image corresponds to a roll associated with a camera used to generate the image.

At (808), the method 800 includes correcting a tilt of the image. For example, the user computing device 102 can correct a tilt of the image 204 based on the estimated tilt of the input image 208. In some implementations, the user computing device 102 can determine that a confidence level corresponding to the estimated tilt of the input image 208 is greater than a threshold value. In some implementations, the user computing device 102 can store the estimated tilt of the input image 208 in association with the image 204.

FIG. 9 depicts a diagram of a method 900 for performing machine learning. At (902), the method 900 includes generating a plurality of training images. For example, the training computing system 150 can generate training data 162 that includes the plurality of training images. In some implementations, the training computing system 150 can generate the training data 162 that includes the plurality of training images having a known tilt. In some implementations, the training computing system 150 can generate the training data 162 that includes a corrected set of images by correcting a respective preexisting tilt of each of a plurality of preexisting images. In some implementations, the training computing system 150 can generate the training data 162 that includes distorting each of the corrected set of images to have its respective known tilt. In some implementations, the training computing system 150 can generate the training data 162 that includes labelling each training image with its respective known tilt. In some implementations, the training computing system 150 can generate the training data 162 that includes adjusting a color space of each of the plurality of preexisting images. In some implementations, adjusting the color space can include converting each of the plurality of preexisting images to monochrome. In some implementations, the training computing system 150 can generate the training data 162 that includes resizing each of the plurality of preexisting images to a first resolution. In some implementations, the training computing system 150 can generate the training data 162 that includes applying at least one of a pitch distortion and a roll distortion to each of the plurality of preexisting images. In some implementations, the training computing system 150 can generate the training data 162 that includes determining a pitch value from a predetermined range, for each of a plurality of preexisting images (which optionally may be included in the training data 162 also), and applying a pitch distortion to each of the plurality of preexisting images based at least in part on the corresponding pitch value. In some implementations, the training computing system 150 can select a random value from a uniform distribution of pitch values within the predetermined range, for each of the plurality of preexisting images, and determine the random value as the pitch value. In some implementations, the training computing system 150 can generate the training data 162 that includes determining a roll value from a predetermined range, for each of the plurality of preexisting images, and applying a roll distortion to each of the plurality of preexisting images based at least in part on the corresponding roll value. In some implementations, the training computing system 150 can select a random value from a uniform distribution of roll values within the predetermined range, for each of the plurality of preexisting images, and determine the random value as the roll value. In some implementations, the training computing system 150 can generate the training data 162 that includes applying, by the computing system, a yaw distortion to each of the plurality of preexisting images, based at least in part on a pitch distortion and a roll distortion corresponding to each of the plurality of training images. In some implementations, the training computing system 150 can generate the training data 162 that includes determining the respective preexisting tilt of each of the plurality of preexisting images based on sensor data associated with each preexisting image.

At (904), the method includes inputting the plurality of images into a machine learned model. For example, the training computing system 150 can input the training data 162 into the image tilt adjustment model 200 via the model trainer 160.

At (906), the method includes obtaining an estimated tilt of each of the plurality of training images. For example, the training computing system 150 can obtain an estimated tilt of the plurality of training images included in the training data 162.

At (908), the method includes training the machine learned model. For example, the training computing system 150 can train the image tilt adjustment model 200 via the model trainer 160. For example, the training computing system 150 can determine an error of the estimated tilt for each image in the plurality of training images, and adjust the image tilt adjustment model 200 to minimize the error.

According to an aspect of the present disclosure, in some implementations, the machine learned model can be used in a pose pipeline to predict a pitch and/or roll associated with an image, instead of, or in addition to, using accelerometer or other sensor data to capture a pitch and/or roll of a camera. For example, a machine learned model can be used in a pose pipeline that is included in a bundling operation on an image set. A bundling operation can include extracting features from each image in the image set to determine a pose for the image set. A pose for the image set can include a pitch and or roll for the image set, such that each image in the image set is aligned with respect to the pitch and or roll for the image set. The pose for the image set can be determined by extracting, for each image in the image set, a pitch and/or roll associated with the image. The pitch and/or roll associated with the image can be determined based on accelerometer or other sensor data of a camera used to generate the image. Additionally, or alternatively, each image in the image set can be input into the machine learned model to obtain an estimated pitch and/or roll associated with the image, and optionally a confidence level for the estimated pitch and/or roll (discussed below).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer implemented method to adjust an image, the method comprising:
    obtaining, by a computing system, data representing an image, the data including measured pitch data and measured roll data associated with a device capturing the image;
    inputting, by the computing system, the data into a machine learned model;
    obtaining, by the computing system, in response to inputting the data into the machine learned model, an output of the machine learned model that includes an estimated tilt of the image, wherein obtaining, by the computing system, in response to inputting the data into the machine learned model, an output of the machine learned model that includes an estimated tilt of the image, comprises:
        obtaining, by the computing system, an estimated pitch and an estimated roll associated with the image; and
        obtaining, by the computing system, a confidence level representing a likelihood that the estimated pitch and estimated roll meet an accuracy criterion;
    determining, by the computing system, that the confidence level is greater than a threshold value;
    responsive to determining that the confidence level is greater than a threshold value:
    updating, by the computing system, the measured pitch data and measured roll data based on the estimated pitch and the estimated roll; and
    correcting, by the computing system, a tilt of the image based at least in part on the measured pitch data and the measured roll data by altering the pitch and roll of the image.

2. The computer-implemented method of claim 1, wherein the estimated pitch associated with the image corresponds to a pitch associated with a camera used to generate the image, and the estimated roll associated with the image corresponds to a roll associated with a camera used to generate the image.

3. The computer-implemented method of claim 1, wherein the image comprises a panoramic image.

4. A computer-implemented method to perform machine learning, the method comprising:
generating, by a computing system, from a plurality of preexisting images a plurality of training images having a respective known tilt and a measured pitch data and measured roll data associated with a device capturing the image; and
training, by the computing system and based at least in part on the plurality of training images, a machine learned model to provide an output comprising:
an estimated tilt of an input image, wherein the estimated tilt comprises an estimated pitch and an estimated roll associated with the image and the measured pitch data and measured roll data associated with a device capturing the image;
a confidence level representing a likelihood that the estimated pitch and estimated roll meet an accuracy criterion; and
image correction data including information associated with altering a pitch and a roll of the input image.

5. The computer-implemented method of claim 4, wherein generating the plurality of training images comprises:
generating, by the computing system, a corrected set of images by correcting a respective preexisting tilt of each of a plurality of preexisting images;
generating, by the computing system, a training set that includes the plurality of training images by distorting each of the corrected set of images to have its respective known tilt; and
labelling, by the computing system, each training image with its respective known tilt.

6. The computer-implemented method of claim 5, wherein generating the training set comprises:
adjusting, by the computing system, a color space of each of the plurality of preexisting images;
resizing, by the computing system, each of the plurality of preexisting images to a first resolution; and,
applying, by the computing system, at least one of a pitch distortion and a roll distortion to each of the plurality of preexisting images.

7. The computer-implemented method of claim 6, wherein adjusting the color space comprises:
converting, by the computing system, each of the plurality of preexisting images to monochrome.

8. The computer-implemented method of claim 5, wherein generating the training set comprises:
determining, by the computing system, a pitch value from a predetermined range, for each of the plurality of preexisting images; and
applying, by the computing system, a pitch distortion to each of the plurality of preexisting images based at least in part on the corresponding pitch value.

9. The computer-implemented method of claim 8, wherein determining the pitch value comprises:
selecting, by the computing system, a random value from a uniform distribution of pitch values within the predetermined range, for each of the plurality of preexisting images; and
determining, by the computing system, the random value as the pitch value.

10. The computer-implemented method of claim 5, wherein generating the training set comprises:
determining, by the computing system, a roll value from a predetermined range, for each of the plurality of preexisting images; and
applying, by the computing system, a roll distortion to each of the plurality of preexisting images based at least in part on the corresponding roll value.

11. The computer-implemented method of claim 10, wherein determining the roll value comprises:
selecting, by the computing system, a random value from a uniform distribution of roll values within the predetermined range, for each of the plurality of preexisting images; and
determining, by the computing system, the random value as the roll value.

12. The computer-implemented method of claim 5, wherein generating the training set comprises:
applying, by the computing system, a yaw distortion to each of the plurality of preexisting images, based at least in part on a pitch distortion and a roll distortion corresponding to each of the plurality of preexisting images.

13. The computer-implemented method of claim 5, further comprising:
determining, by the computing system, the respective preexisting tilt of each of the plurality of preexisting images based on sensor data associated with each preexisting image.

14. The computer-implemented method of claim 4, wherein training the machine learned model comprises:
inputting, by the computing system, the plurality of training images into the machine learned model;
obtaining, by the computing system, in response to inputting the plurality of training images, an output of the machine learned model that includes an estimated tilt of each image in the plurality of training images;
determining, by the computing system, an error of the estimated tilt for each image in the plurality of training images; and
adjusting, by the computing system, the machine learned model to minimize the error.

15. A computer system, comprising:
one or more processors; and
one or more non-transitory computer-readable media that, when executed by the one or more processors, cause the computer system to perform operations, the operations comprising:
obtaining data representing an image, the data including measured pitch data and measured roll data associated with a device capturing the image;
inputting the image into a machine learned model;
obtaining in response to inputting the image into the machine learned model, an output of the machine learned model that includes an estimated tilt of the image, wherein obtaining in response to inputting the image into the machine learned model, the output of the machine learned model that includes the estimated tilt of the image, comprises:
obtaining an estimated pitch and an estimated roll associated with image; and
obtaining a confidence level representing a likelihood that the estimated pitch and estimated roll are accurate;
determining, by the computing system, that the confidence level is greater than a threshold value; and responsive to determining that the confidence level is greater than a threshold value:
  updating the measured pitch data and measured roll data based on the estimated pitch and the estimated roll; and
  correcting a tilt of the image based at least in part on the measured pitch data and the measured roll data by altering the pitch and roll of the image.

16. A computer system, comprising:
  one or more processors; and
  one or more non-transitory computer-readable media that, when executed by the one or more processors, cause the computer system to perform operations, the operations comprising:
    generating a plurality of training images having a respective known tilt and a measured pitch data and measured roll data associated with a device capturing the image; and
    training, based at least in part on the plurality of training images, a machine learned model to provide an output, the output comprising:
      an estimated tilt for an input image, wherein the estimated tilt comprises estimated pitch and an estimated roll associated with the image and the measured pitch data and measured roll data associated with a device capturing the image;
      a confidence level representing a likelihood that the at least one of the estimated pitch and estimated roll meet an accuracy criterion; and
      image correction data including information associated with altering a pitch
      and a roll of the input image.

17. The computer system of claim 16, wherein training the machine learned model comprises:
  inputting each of the plurality of training images into the machine learned model;
  obtaining in response to inputting the plurality of training images, an output of the machine learned model that includes an estimated tilt for each of the plurality of training images;
  determining a loss value that describes a difference between the respective predicted tilt and the respective known tilt for each of the plurality of training images; and
  adjusting one or more parameters of the machine learned model to reduce the loss value.

* * * * *